United States Patent
Liu et al.

(10) Patent No.: US 12,150,000 B2
(45) Date of Patent: Nov. 19, 2024

(54) METHOD, NETWORK DEVICE, AND APPARATUS COMMUNICATION SYSTEM HANDOVER, AND MEDIUM

(71) Applicant: DATANG MOBILE COMMUNICATIONS EQUIPMENT CO., LTD., Beijing (CN)

(72) Inventors: Aijuan Liu, Beijing (CN); Hucheng Wang, Beijing (CN); Qiang Deng, Beijing (CN); Jiancheng Sun, Beijing (CN); Ying Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 506 days.

(21) Appl. No.: 17/426,618

(22) PCT Filed: Dec. 18, 2019

(86) PCT No.: PCT/CN2019/126356
§ 371 (c)(1),
(2) Date: Jul. 28, 2021

(87) PCT Pub. No.: WO2020/155906
PCT Pub. Date: Aug. 6, 2020

(65) Prior Publication Data
US 2022/0141746 A1    May 5, 2022

(30) Foreign Application Priority Data

Jan. 29, 2019  (CN) .......................... 201910087223.9

(51) Int. Cl.
*H04W 36/18* (2009.01)
*H04W 36/00* (2009.01)
(Continued)

(52) U.S. Cl.
CPC ....... *H04W 36/18* (2013.01); *H04W 36/0016* (2013.01); *H04W 36/0033* (2013.01); *H04W 36/30* (2013.01); *H04W 36/385* (2013.01)

(58) Field of Classification Search
CPC .................................................. H04W 36/18
(Continued)

(56) References Cited

U.S. PATENT DOCUMENTS

| | | | |
|---|---|---|---|
| 11,665,636 B2 * | 5/2023 | Yang | H04W 48/06 370/338 |
| 2018/0199243 A1 * | 7/2018 | Bharatia | H04W 76/34 |
| 2020/0275331 A1 * | 8/2020 | Kim | H04W 36/0022 |

FOREIGN PATENT DOCUMENTS

| | | |
|---|---|---|
| CN | 101600238 A | 12/2009 |
| CN | 102076054 A | 5/2011 |

(Continued)

OTHER PUBLICATIONS

Samsung, "Data forwarding for Inter-system handover from EPS to 5GS", 3GPP TSG-RAN WG3 Meeting #98, Reno, NV, USA, Nov. 27-Dec. 1, 2017, total 9 pages, R3-174599.

(Continued)

*Primary Examiner* — Qutbuddin Ghulamali
(74) *Attorney, Agent, or Firm* — Kilpatrick Townsend & Stockton LLP

(57) ABSTRACT

Embodiments of the present application relate to the field of communication and provide a method, a network device, and an apparatus for communication system handover, and a medium, for handover of the communication system of a terminal. The method includes: includes an AMF sends a handover request carrying first indication information to an NG-RAN node corresponding to an identifier of a target (Continued)

NG-RAN node; and the NG-RAN node determines the address of data forwarding according to the first indication information.

14 Claims, 8 Drawing Sheets

(51) Int. Cl.
*H04W 36/30* (2009.01)
*H04W 36/38* (2009.01)

(58) Field of Classification Search
USPC ........................................................ 455/435
See application file for complete search history.

(56) References Cited

FOREIGN PATENT DOCUMENTS

| | | | |
|---|---|---|---|
| CN | 105848222 A | 8/2016 | |
| CN | 108282832 A | 7/2018 | |
| CN | 108811016 A | 11/2018 | |
| CN | 109151929 A | 1/2019 | |
| CN | 109155949 A | 1/2019 | |
| WO | WO-2020091670 A1 * | 5/2020 | ........... H04L 1/1896 |

OTHER PUBLICATIONS

Ericsson, "Packet forwarding at EPS to 5GS inter-system handover", SA WG2 Meeting #S2-129, Oct. 15-19, 2018, Dongguan, P.R. China, total 8 pages, S2-1810382.

Samsung, "Data forwarding for Inter-system Inter-RAT handover from 5GS to EPS", 3GPP TSG-RAN WG3 Meeting #97, Berlin, Germany, Aug. 21-25, 2017, total 6 pages, R3-172974.

CATT, "Direct forwarding flag for handover from EPS to 5GS", 3GPP TSG-SA WG2 Meeting #126, Montreal, Canada, Feb. 26-Mar. 2, 2018, total 5 pages, S2-182683.

Samsung, "Data Forwarding in NG Based Handover", 3GPP TSG-RAN WG3 NR AdHoc 1801, Sophia Antipolis, France, Jan. 22-26, 2018, total 12 pages, R3-180257.

NTT Docomo, Inc. "Data forwarding on Inter-system HO", 3GPP TSG-RAN WG3 RAN3#102, Spokane, Washington, USA, Nov. 12, 2018-Nov. 16, 2018, total 11 pages, R3-186614.

CATT, "Direct forwarding flag for handover from EPS to 5GS", 3GPP TSG-SA WG2 Meeting #126, Montreal, Canada, Feb. 26-Mar. 2, 2018, total 9 pages, S2-181514.

3GPP Procedures for the 5G System; Stage 2, 3GPP TS 23.502 V15.4.1, total 5 pages, Release 15, Jan. 2019.

* cited by examiner

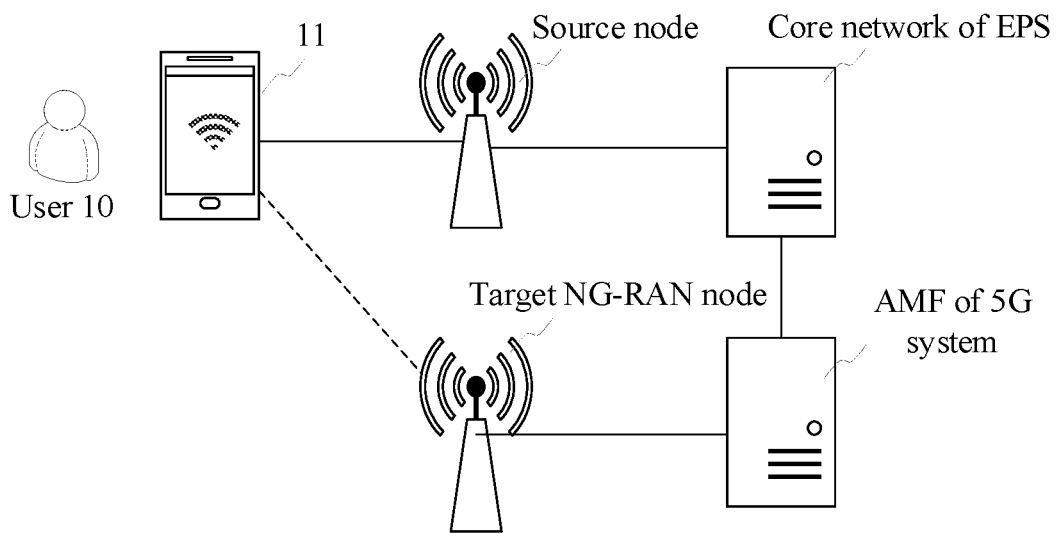

FIG. 1

An AMF receives a handover request sent by a core network side of an EPS, and the handover request carries first indication information about whether a source node supports direct data forwarding and a target NG-RAN node identifier /201

The AMF sends the handover request carrying the first indication information to an NG-RAN node corresponding to the target NG-RAN node identifier /202

FIG. 2

METHOD, NETWORK DEVICE, AND APPARATUS COMMUNICATION SYSTEM HANDOVER, AND MEDIUM

CROSS-REFERENCE TO RELATED APPLICATIONS

The present application is a US National Stage of International Application No. PCT/CN2019/126356, filed on Dec. 18, 2019, which claims the priority of the Chinese patent application No. 201910087223.9 filed to the China Patent Office on Jan. 29, 2019 and entitled "METHOD, NETWORK DEVICE, AND APPARATUS FOR COMMUNICATION SYSTEM HANDOVER, AND MEDIUM", the entire contents of which are incorporated herein by reference.

FIELD

The present application relates to the field of communication, in particular to a method, a network device, and an apparatus for communication system handover, and a medium.

BACKGROUND

With the development of mobile communication, the development of 5G is changing with each passing day. A 5G system can provide a greater bandwidth and a higher transmission rate for a user equipment (UE). However, the initial deployment of 5G is not mature, while the coverage and technology of an evolved packet system (EPS) network are mature. In order to provide better services for UE and ensure the continuity of services, a solution of supporting the seamless handover of UE between a 5G system and a current mainstream EPS is needed.

SUMMARY

To switch the UE between a 5G system and an EPS, embodiments of the present application provide a method, a network device, and an apparatus for communication system handover, and a medium. According to the embodiments of the present application, nodes of the 5G system and nodes under the EPS can make consistent decisions on the data forwarding mode, thus ensuring the normal operation of the data forwarding.

In one embodiment of the present application provides a method for communication system handover, where the method is applied to an authentication management function node (AMF) of a 5G system and the method includes: receiving a handover request sent by a core network side of an EPS, where the handover request carries first indication information about whether a source node supports direct data forwarding and a target NG-RAN node identifier; and
  sending the handover request carrying the first indication information to an NG-RAN node corresponding to the target NG-RAN node identifier, for determining an address of data forwarding by the NG-RAN node according to the first indication information.

In one embodiment, the first indication information is located in a newly added information element (IE) of the handover request; or,
  the first indication information is located in an original IE of the handover request.

In one embodiment, the method further includes:
acquiring an EPS context of a terminal needing system handover;
sending a protocol data unit (PDU) session establishment request to a session management function (SMF), where the PDU session establishment request carries the first indication information, the EPS context, the target NG-RAN node identifier and a source node identifier of the source node; and
receiving a response, returned by the SMF, to the PDU session establishment request, where the response includes PDU sessions, a mapping relationship between the PDU sessions and the EPS context, and second indication information about whether the target NG-RAN node and the source node support indirect data forwarding.

In one embodiment, the first indication information is located in a newly added IE of the PDU session establishment request; or,
  the first indication information is stored in an original IE of the PDU session establishment request.

In one embodiment, the sending the handover request carrying the first indication information to the NG-RAN node corresponding to the target NG-RAN node identifier includes:
sending a handover request carrying the PDU sessions, the mapping relationship, the first indication information and the second indication information to the NG-RAN node corresponding to the NG-RAN node identifier, for determining a PDU session needing data forwarding according to the PDU sessions and the mapping relationship and determining the address of data forwarding according to the first indication information and the second indication information by the NG-RAN node;
receiving the PDU session which is determined to need data forwarding and the determined address of data forwarding sent by the NG-RAN node; and
forwarding the PDU session needing data forwarding and the determined address of data forwarding to an SMF.

In one embodiment, when the first indication information indicates that the source node does not support direct data forwarding, the method further includes:
receiving an address of an intermediate node sent by an SMF for supporting indirect data forwarding; and
sending the address of the intermediate node for supporting indirect data forwarding to the core network of the EPS.

In one embodiment, when the first indication information indicates that the source node supports direct data forwarding, the method further includes:
sending an E-RAB address allocated by the NG-RAN node to the core network of the EPS.

In another embodiment of the present application further provides a method for communication system handover, where the method is applied to an NG-RAN of a 5G system and includes: receiving a handover request sent by an AMF, where the handover request carries first indication information about whether a source node supports direct data forwarding; and
  determining an address of data forwarding according to the first indication information.

In one embodiment, the handover request further includes PDU sessions, a mapping relationship between an EPS context and quality of service (QOS) flows of the PDU sessions, and second indication information about whether a target NG-RAN node and the source node support indirect data forwarding, and the method further includes:
  determining the PDU session needing data forwarding according to the mapping relationship and the PDU sessions; and
  where the determining the address of data forwarding according to the first indication information includes:
  determining the address of data forwarding according to the first indication information and the second indication information; and
  sending the PDU session needing data forwarding and the determined address of data forwarding to the AMF, for forwarding the PDU session needing data forwarding and the determined address of data forwarding by the AMF to a SMF.

In one embodiment of the present application provides a method for communication system handover, where the method is applied to an SMF of a 5G system and the method includes:
  receiving a PDU session establishment request sent by an AMF, where the PDU session establishment request carries first indication information about whether a source node supports direct data forwarding, an EPS context, a target NG-RAN node identifier and a source node identifier; and
  returning a response to the PDU session establishment request to the AMF, where the response includes PDU sessions, a mapping relationship between the PDU sessions and the EPS context, and second indication information about whether a target NG-RAN node and the source node support indirect data forwarding, for sending the PDU sessions, the mapping relationship and the second indication information by the AMF to the NG-RAN node.

After receiving the PDU session establishment request sent by the AMF, the method further includes:
  according to the target NG-RAN node identifier and the source node identifier, determining whether the NG-RAN node and the source node support indirect data forwarding; and
  mapping the EPS context to QOS flows of the PDU sessions.

In one embodiment, the method further includes: receiving a PDU session needing data forwarding sent by an AMF and the determined address of data forwarding; and
  sending an address of an intermediate node for supporting indirect data forwarding to the AMF when the first indication information indicates that the source node does not support direct data forwarding and the second indication information indicates that the source node and the target NG-RAN node support indirect data forwarding.

In one embodiment of the present application further provides a method for communication system handover, where the method is applied to a core network mobility management entity (MME) of an EPS and the method includes:
  receiving a handover message sent by a source node, where the handover message includes a target NG-RAN node identifier and first indication information about whether the source node supports direct data forwarding; and
  sending a handover request to an AMF, where the handover request carries the first indication information and the target NG-RAN node identifier, for sending the handover request carrying the first indication information by the AMF to an NG-RAN node corresponding to the target NG-RAN node identifier.

In one embodiment, when the first indication information indicates that the source node does not support direct data forwarding, the method further includes:
  receiving an address of an intermediate node for indirect data forwarding sent by the AMF; and
  according to the address of the intermediate node, providing an address for indirect data forwarding at an EPS side.

In one embodiment, when the first indication information indicates that the source node supports direct data forwarding, the method further includes:
  receiving an E-RAB address for supporting direct data forwarding sent by the AMF.

In one embodiment of the application further provides a network device for communication system handover, where the network device includes a processor, a memory and a transceiver; and
  the processor is configured to read a program in the memory and executing:
  receiving a handover request sent by a core network side of an EPS, where the handover request carries first indication information about whether a source node supports direct data forwarding and a target NG-RAN node identifier; and
  sending the handover request carrying the first indication information to an NG-RAN node corresponding to the target NG-RAN node identifier, for determining an address of data forwarding by the NG-RAN node according to the first indication information.

In one embodiment, the first indication information is located in a newly added IE of the handover request; or,
  the first indication information is located in an original IE of the handover request.

In one embodiment, the processor is further configured to: acquire an EPS context of a terminal needing system handover; send a PDU session establishment request to an SMF, where the PDU session establishment request carries the first indication information, the EPS context, the target NG-RAN node identifier and a source node identifier of the source node; and receive a response, returned by the SMF, to the PDU session establishment request, where the response includes PDU sessions, a mapping relationship between the PDU sessions and the EPS context, and second indication information about whether the target NG-RAN node and the source node support indirect data forwarding.

In one embodiment, the first indication information is located in a newly added IE of the PDU session establishment request; or,
  the first indication information is stored in an original IE of the PDU session establishment request.

In one embodiment, the processor is configured to: send a handover request carrying the PDU sessions, the mapping relationship, the first indication information and the second indication information to the NG-RAN node corresponding to the NG-RAN node identifier, for determining a PDU session needing data forwarding according to the PDU sessions and the mapping relationship, and determining the address of data forwarding according to the first indication information and the second indication information by the NG-RAN node;
  receive the PDU session which is determined to need data forwarding and the determined address of data forwarding sent by the NG-RAN node; and
  forward the PDU session needing data forwarding and the determined address of data forwarding to an SMF.

In one embodiment, when first indication information indicates that the source node does not support direct data forwarding, and the second indication information indicates that the source node and the target NG-RAN node support indirect data forwarding, the processor is further configured to: receive an address of an intermediate node sent by an SMF for supporting indirect data forwarding; and send the address of the intermediate node for supporting indirect data forwarding to the core network of the EPS.

In one embodiment, when the first indication information indicates that the source node supports direct data forwarding, the processor is further configured to: send an E-RAB address allocated by the NG-RAN node to the core network of the EPS.

In one embodiment of the application provides a second type of network device for communication system handover, where the network device includes a processor, a memory and a transceiver; and the processor is configured to read a program in the memory and executing:

receiving a handover request sent by an AMF, where the handover request carries first indication information about whether a source node supports direct data forwarding; and the processor is further configured to determine an address of data forwarding according to the first indication information.

In one embodiment, the handover request further includes PDU sessions, a mapping relationship between an EPS context and QOS flows of the PDU sessions, and second indication information about whether a target NG-RAN node and the source node support indirect data forwarding, and the processor is further configured to determine the PDU session needing data forwarding according to the mapping relationship and the PDU sessions; and the processor is configured to: determine the address of data forwarding according to the first indication information and the second indication information; and send the PDU session needing data forwarding and the determined address of data forwarding to the AMF, for forwarding the PDU session needing data forwarding and the determined address of data forwarding by the AMF to an SMF.

In one embodiment of the present application further provides a third type of network device for communication system handover, where the device includes a processor, a memory and a transceiver;

the processor is configured to read a program in the memory and executing:

receiving a PDU session establishment request sent by an AMF, where the PDU session establishment request carries first indication information about whether a source node supports direct data forwarding, a target NG-RAN node identifier, and a source node identifier of the source node; and returning a response to the PDU session establishment request to the AMF, where the response includes PDU sessions, a mapping relationship between the PDU sessions and an EPS context, and second indication information about whether a target NG-RAN node and the source node support indirect data forwarding, for sending the PDU sessions, the mapping relationship and the second indication information by the AMF to the NG-RAN node.

In one embodiment, the processor is further configured to determine whether the NG-RAN node and the source node support indirect data forwarding according to the target NG-RAN node identifier and the source node identifier; and mapping the EPS context to QOS flows of the PDU sessions.

In one embodiment, the processor is further configured to send an address of an intermediate node for supporting indirect data forwarding to the AMF when the first indication information indicates that the source node does not support direct data forwarding and the second indication information indicates that the source node and the target NG-RAN node support indirect data forwarding.

In one embodiment of the present application provides a fourth type of network device for communication system handover, where the device includes a processor, a memory and a transceiver; and the processor is configured to read a program in the memory and executing:

receiving a handover message sent by a source node, where the handover message includes a target NG-RAN node identifier and first indication information about whether the source node supports direct data forwarding; and sending a handover request to an AMF, where the handover request carries the first indication information and the target NG-RAN node identifier, for sending the handover request carrying the first indication information by the AMF to an NG-RAN node corresponding to the target NG-RAN node identifier.

In one embodiment, when the first indication information indicates that the source node does not support direct data forwarding, the processor is further configured to: receive an address of an intermediate node for indirect data forwarding sent by the AMF; and according to the address of the intermediate node, provide an address for indirect data forwarding at an EPS side.

In one embodiment, when the first indication information indicates that the source node supports direct data forwarding, and the processor is further configured to receive an E-RAB address for supporting direct data forwarding sent by the AMF.

In one embodiment of the application further provides an apparatus for communication system handover, including:

a first receiving device, configured to receive a handover request sent by a core network side of an EPS, where the handover request carries first indication information about whether a source node supports direct data forwarding and a target NG-RAN node identifier; and a first sending device, configured to send the handover request carrying the first indication information to an NG-RAN node corresponding to the target NG-RAN node identifier, for determining an address of data forwarding by the NG-RAN node according to the first indication information.

In one embodiment of the application further provides a second type of apparatus for communication system handover, including:

a second receiving device, configured to receive a handover request sent by an AMF, where the handover request carries first indication information about whether a source node supports direct data forwarding; and a processing device, configured to determine an address of data forwarding according to the first indication information.

In one embodiment of the application further provides a third type of apparatus for communication system handover, including:

a third receiving device, configured to receive a PDU session establishment request sent by an AMF, where the PDU session establishment request carries first indication information about whether a source node supports direct data forwarding, an EPS context, a target NG-RAN node identifier and a source node identifier; and a second processing device, configured to return a response to the PDU session establishment request to the AMF, where the response includes PDU sessions, a mapping relationship between the PDU sessions and the EPS context, and second indication information about whether a target NG-RAN node and the source node support indirect data forwarding, for sending the PDU sessions, the mapping relationship and the second indication information by the AMF to the NG-RAN node.

In one embodiment of the application further provides a fourth type of apparatus for communication system handover, including:

a fourth receiving device, configured to receive a handover message sent by a source node, where the handover message includes a target NG-RAN node identifier and first indication information about whether the source node supports direct data forwarding; and a second sending device, configured to send a handover request to an AMF, where the handover request carries the first indication information and the target NG-RAN node identifier, for sending the handover request carrying the first indication information by the AMF to an NG-RAN node corresponding to the target NG-RAN node identifier.

Another embodiment of the application further provides a computer storage medium, where the computer storage medium stores computer executable instructions, and the computer executable instructions are used to make a computer execute any method for communication system handover according to the embodiments of the present application.

According to the method, the network device and the apparatus for communication system handover, and the medium provided by the embodiments of this application, since the handover request carrying the first indication information is sent to the NG-RAN node corresponding to the target NG-RAN node identifier, and the PDU session establishment request carrying the first indication information and the address of data forwarding determined by the NG-RAN node is sent to the SMF, the nodes of the 5G system and the nodes of the EPS make consistent decisions on the data forwarding mode, thus ensuring normal data forwarding.

Additional embodiments of the present application will be set forth in the description which follows, and in part will be apparent from the description, or may be learned by practice of the present application. The embodiments of the present application can be realized and obtained by the structure particularly pointed out in the written specification, claims, and drawings.

BRIEF DESCRIPTION OF THE DRAWINGS

In order to explain the embodiments of the present disclosure more clearly, the drawings needed to be used in the embodiments of the present disclosure will be briefly introduced below.

FIG. 1 is a schematic diagram of an application scenario of a method for communication system handover according to an embodiment of the present application.

FIG. 2 is a flowchart of a method for communication system handover according to an embodiment of the present application.

DETAILED DESCRIPTION OF THE EMBODIMENTS

Figures 3, 4:
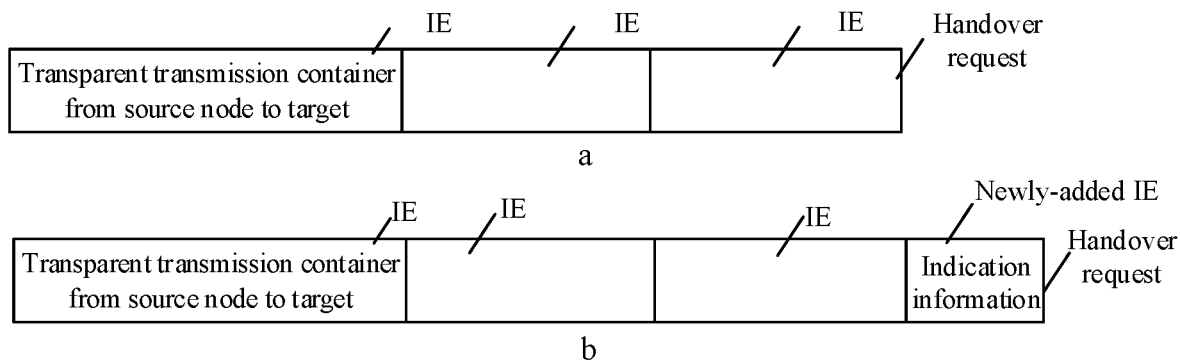
FIG. 3 is a schematic diagram of a handover request according to an embodiment of the present application.
FIG. 4 is another flowchart of a method for communication system handover according to an embodiment of the present application.

Data forwarding: in a clock cycle, a central processing unit (CPU) copies an output value of one unit into an input value of another unit.

Direct data forwarding: a source node and a target next generation-radio access network (NG-RAN) node can directly transfer data without passing through a core network, i.e., data is directly transferred from the source node to the target NG-RAN node.

Indirect data forwarding: the source node and the target NG-RAN node need to transfer data by passing through the core networks, i.e., data is transferred from the source node to the core network of an evolved packet system (EPS), then to the core network of a 5G system and finally to the target NG-RAN node.

IE: Information element, which refers to an information element in signaling.

E-RAB: E-UTRAN radio access bearer, evolved radio access bearer. E-RAB refers to a bearer of a user plane, which is used to transmit voice, data and multimedia services between user equipment (UE) and a core network (CN).

EPS: an evolved packet system is a concept emerged by 3GPP standards Committee in the 4th generation mobile communication. It can be considered that EPS=UE+LTE (4G access network part)+EPC (evolved packet core).

MME: a mobility management entity is a key control node of an LTE access network of a 3GPP protocol, which is responsible for the positioning and paging process of the UE in an idle mode, including relay. Simply speaking, MME is responsible for signaling processing. That is, the MME can be regarded as a core network node of the EPS.

AMF: Authentication Management Function, is a core network of the 5G system.

NG-RAN: next generation-radio access network, which is a node of the 5G system.

SMF: session management function node, which is a node of the 5G system.

The network architectures and service scenarios described in the embodiments of the present application are for the purpose of explaining the embodiments of the present application more clearly, and do not constitute a limitation on the embodiments of the present application. The evolution of the network architectures and the emergence of new service scenarios, the embodiments of the present application is equally applicable to similar problems.

A 5G system may provide a larger bandwidth and a higher transmission rate for UE. At present, a 5G network is not mature, while existing EPS networks are all very mature. In order to provide a better server for the UE, it is very important to support the handover between the 5G system and an EPS. A protocol data unit (PDU) session of 5G is different from public data network (PDN) connection of the EPS in forms. 5G uses the PDU session to manage multiple quality of service (QOS) flows, while the EPS uses the PDN connection to manage multiple EPS bearers. In the process of handover between different systems, bearer conversion is carried out, and the function of bearer conversion is completed in a CN. As for the data forwarding function, in the previous inter-system handover, data forwarding may not be directly performed, that is, the data forwarding must pass through the core network, which leads to the delay of data forwarding. In the handover process between EPS and 5G, in order to reduce the handover delay, it is considered that direct data forwarding may be adopted when the connection between RAN nodes in the EPS and RAN nodes in the 5G system is reachable. However, the current standards may lead to different decisions between nodes in the EPS and nodes in the 5G system on whether to adopt direct data forwarding, which leads to problems in data forwarding.

Aiming at the above scenario, the present application provides a method for communication system handover, a network device, an apparatus and a medium. In order to clearly understand the embodiments of the present application, firstly, the basic principle of the embodiments of the present application is briefly explained.

In order to make decisions of each node of a 5G system and each node of an EPS on the data forwarding mode are consistent, an embodiment of the present application provides a method for communication system handover. In this method, a source node of the EPS decides to switch a terminal to 5G based on the measurement information of the terminal. The source node sends a handover message to an MME, where the handover message carries a target NG-RAN node identifier and first indication information that whether the source node supports direct data forwarding. The MME sends a handover request to an AMF, where the handover request carries the first indication information and the target NG-RAN node identifier. The AMF sends the handover request carrying the first indication information to the NG-RAN node corresponding to the target NG-RAN node identifier. The NG-RAN node determines the address of data forwarding according to the first indication information.

In this way, by sending the first indication information about whether the source node supports direct data forwarding to the target NG-RAN node, the NG-RAN node can know whether the source node supports direct data forwarding, to achieve the purpose that the decisions of the nodes of the EPS and the nodes of the 5G system on the data forwarding mode are consistent.

As shown in FIG. 1, it is a schematic diagram of an application scenario in which communication system handover is completed by an embodiment of the present application. The scenario includes a terminal 11 of a user 10, a source node, a core network of an EPS, an AMF of a 5G system and a target NG-RAN node. In this scenario, the terminal 11 works in the EPS.

The source node decides to switch the terminal 11 of the user 10 from the EPS to a 5G system, and sends a handover message to the core network of the EPS, where the handover message carries first indication information that the source node supports direct data forwarding and a target NG-RAN node identifier. The core network of the EPS sends a handover request to the AMF, where the request includes the first indication information and the target NG-RAN node identifier. The AMF sends a handover request to the target NG-RAN node, and an IE is newly added to the handover request, where the IE carries the first indication information that the source node supports direct data forwarding. The NG-RAN node provides an E-RAB address for direct data forwarding. The source node and the NG-RAN node may directly forward data through this address, and switch the terminal 11 to the 5G system.

Among them, the terminal is an apparatus with a wireless communication function, which may be deployed on land, including indoor or outdoor, hand-held or vehicle-mounted. The terminal may also be deployed on the water surface (such as ships, etc.), and may also be deployed in the air (such as airplanes, balloons and satellites, etc.). The terminal may be a mobile phone, a pad, a computer with a wireless transceiving function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city or a smart home, etc. The terminal may also be various forms of UE, a mobile station (MS), and the terminal device. The UE in FIG. 1 is a specific example of the terminal in the present application.

As shown in FIG. 2, it is a flow chart of a method for communication system handover according to an embodiment of the present application, and the flow includes the following steps.

Step 201: An AMF receives a handover request sent by a core network side of an EPS, and the handover request carries first indication information about whether a source node supports direct data forwarding and a target NG-RAN node identifier.

Step 202: The AMF sends the handover request carrying the first indication information to an NG-RAN node corresponding to the target NG-RAN node identifier.

In this way, by carrying the first indication information about whether the source node supports direct data forwarding in the handover request, the target NG-RAN node may determine an address of data forwarding according to the first indication information. Therefore, decisions of nodes of an EPS and nodes of a 5G system on the data forwarding mode are consistent, and normal data forwarding is ensured.

In specific implementation, the first indication information is located in an original IE of the handover request; or, the first indication information is located in a newly added IE of the handover request. As shown in FIG. 3, it is a schematic diagram of adding the first indication information to the handover request according to an embodiment of the present application. As shown in "a" of FIG. 3, the handover request contains IEs, for example, a Sourcetotarget Container, etc. Therefore, the first indication information may be placed in the Sourcetotarget Container, or may be added to other idle IEs. In one embodiment, as shown in "b" of FIG. 3, a new IE may be added to the handover request, and the first indication information may be placed in the newly added IE.

In the above step 201, the handover request sent by the core network of the EPS is obtained through steps A1-A2 as shown in FIG. 4.

Step A1: an MME receives a handover message sent by a source node, and the handover message includes a target NG-RAN node identifier and first indication information about whether the source node supports direct data forwarding.

Step A2: The MME sends a handover request to an AMF, and the handover request carries the first indication information and the target NG-RAN node identifier.

According to the above method, the AMF may send the handover request carrying the first indication information to the target NG-RAN node according to the first indication information in the handover request, so that the NG-RAN node knows whether the source node supports direct data forwarding, to achieve the purpose that the decisions of the source node of the EPS and the NG-RAN node on the data forwarding mode are consistent.

Figure 5:
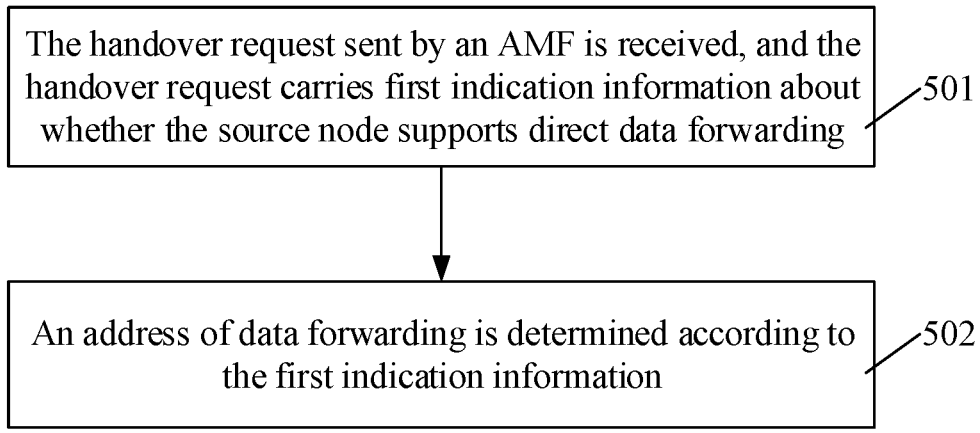
FIG. 5 is another flowchart of a method for communication system handover according to an embodiment of the present application.

In a possible implementation, after the AMF sends the handover request to the NG-RAN node corresponding to the target NG-RAN node identifier in step 202 above, the target NG-RAN node carries out the steps as shown in FIG. 5.

Step 501: the handover request sent by the AMF is received, and the handover request carries first indication information about whether the source node supports direct data forwarding.

Step 502: An address of data forwarding is determined according to the first indication information.

In this way, the target NG-RAN node may know whether the source node supports direct data forwarding, so that decisions of nodes of a 5G system and nodes of an EPS on the data forwarding mode may be consistent. The NG-RAN node determines the address of data forwarding according to the first indication information, which may carry out normal data forwarding.

After the above step 201, the AMF obtains an EPS context of a terminal which needs to switch a system, and sends a PDU session establishment request to an SMF, where the PDU session establishment request carries the first indication information, the EPS context, the target NG-RAN node identifier and a source node identifier of the source node.

In this way, the SMF may determine whether the source node supports direct data forwarding, so that the decisions of nodes of the 5G system and the nodes of the EPS on the data forwarding mode are consistent.

In specific implementation, a new IE may be added to the PDU session establishment request, and the first indication information may be placed in a newly added IE, or the first indication information may be placed in an original IE in the PDU session establishment request.

Figure 6:
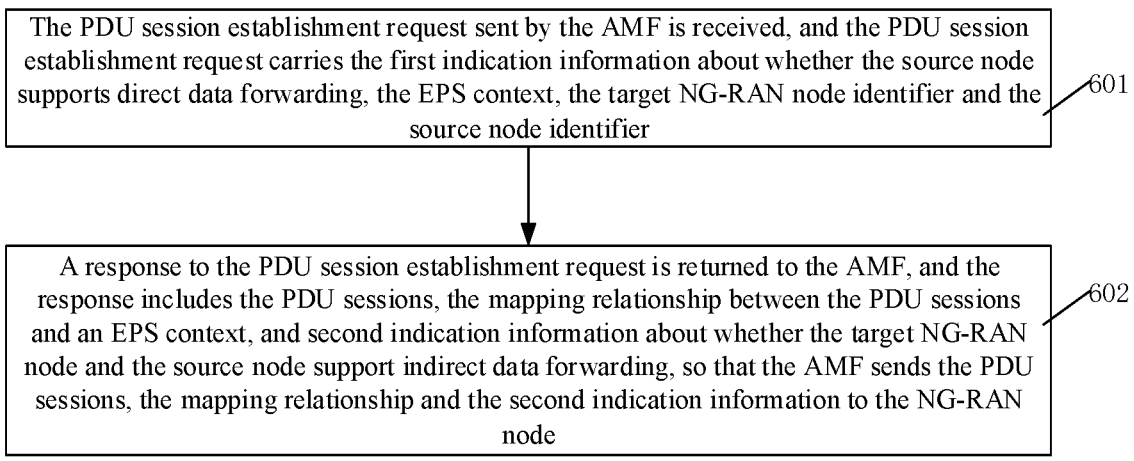
FIG. 6 is another flowchart of a method for communication system handover according to an embodiment of the present application.

After the AMF sends the PDU session establishment request to the SMF, the SMF carries out the steps as shown in FIG. 6.

Step 601: the PDU session establishment request sent by the AMF is received, and the PDU session establishment request carries the first indication information about whether the source node supports direct data forwarding, the EPS context, the target NG-RAN node identifier and the source node identifier.

In specific implementation, after receiving the PDU establishment request sent by the AMF, the SMF determines whether the target NG-RAN node and the source node support indirect data forwarding according to the target NG-RAN node identifier and the source node identifier, and maps the EPS context to QOS flows of PDU sessions.

Step 602: a response to the PDU session establishment request is returned to the AMF, and the response includes the PDU sessions, the mapping relationship between the PDU sessions and an EPS context, and second indication information about whether the target NG-RAN node and the source node support indirect data forwarding, so that the AMF sends the PDU sessions, the mapping relationship and the second indication information to the NG-RAN node.

In this way, the SMF can know whether the source node supports direct data forwarding and send the second indication information about whether the source node and the target NG-RAN node support indirect data forwarding to the NG-RAN node, to achieve the purpose that the decisions of nodes of the 5G system and the nodes of the EPS on the data forwarding mode are consistent.

In addition, 5G uses PDU sessions to manage multiple QOS flows, and the EPS use PDN connection to manage multiple EPS bearers. According to the above method, the EPS context may also be converted into the QOS flows of the PDU sessions in 5G.

The above step 202 may be executed as steps B1-B3.

Step B1: a handover request carrying the PDU sessions, the mapping relationship, the first indication information and the second indication information is sent to the NG-RAN node corresponding to the NG-RAN node identifier.

Specifically, the NG-RAN node determines the PDU session needing data forwarding according to the PDU sessions and the mapping relationship, and determines the address of data forwarding according to the first indication information and the second indication information.

Step B2: the PDU session which is determined to need data forwarding and the determined address of data forwarding sent by the NG-RAN node are received.

Step B3: the PDU session needing data forwarding and the determined address of data forwarding are forwarded to the SMF.

In this way, the NG-RAN node may know whether the source node supports direct data forwarding and whether the source node and NG-RAN node support indirect data forwarding. Therefore, the decisions of the nodes of the 5G system and the nodes of the EPS on the data forwarding mode are consistent.

When the source node does not support direct data forwarding, and the source node and the target NG-RAN node support indirect data forwarding, the SMF sends an address of an intermediate node for supporting indirect data forwarding to the AMF. The AMF receives the address of the intermediate node for indirect data forwarding sent by the SMF, and sends the address of the intermediate node for indirect data forwarding to a core network of the EPS. After receiving the address of the intermediate node sent by the AMF, the core network of the EPS provides an address of a EPS side for indirect data forwarding according to the address of the intermediate node.

With the above method, when the source node does not support direct data forwarding and the source node and the target NG-RAN node support indirect data forwarding, the core network of EPS and a core network of 5G may carry out indirect data forwarding according to an address of an intermediate node of the 5G system provided by the SMF and an address of the EPS side provided by the MME.

When the source node supports direct data forwarding, the AMF sends an E-RAB address allocated by the NG-RAN node to the core network of the EPS. The core network of the EPS receives the E-RAB address.

In this way, when the source node supports direct data forwarding, the NG-RAN node may allocate the E-RAB address and send the E-RAB address to the MME of the EPS, so that decisions of the nodes of the EPS and the nodes of the 5G system on the data forwarding mode may be consistent. In addition, the E-RAB address is used for direct data forwarding between the source node and the NG-RAN, and the direct data forwarding may reduce the delay of the system handover.

Figure 7:
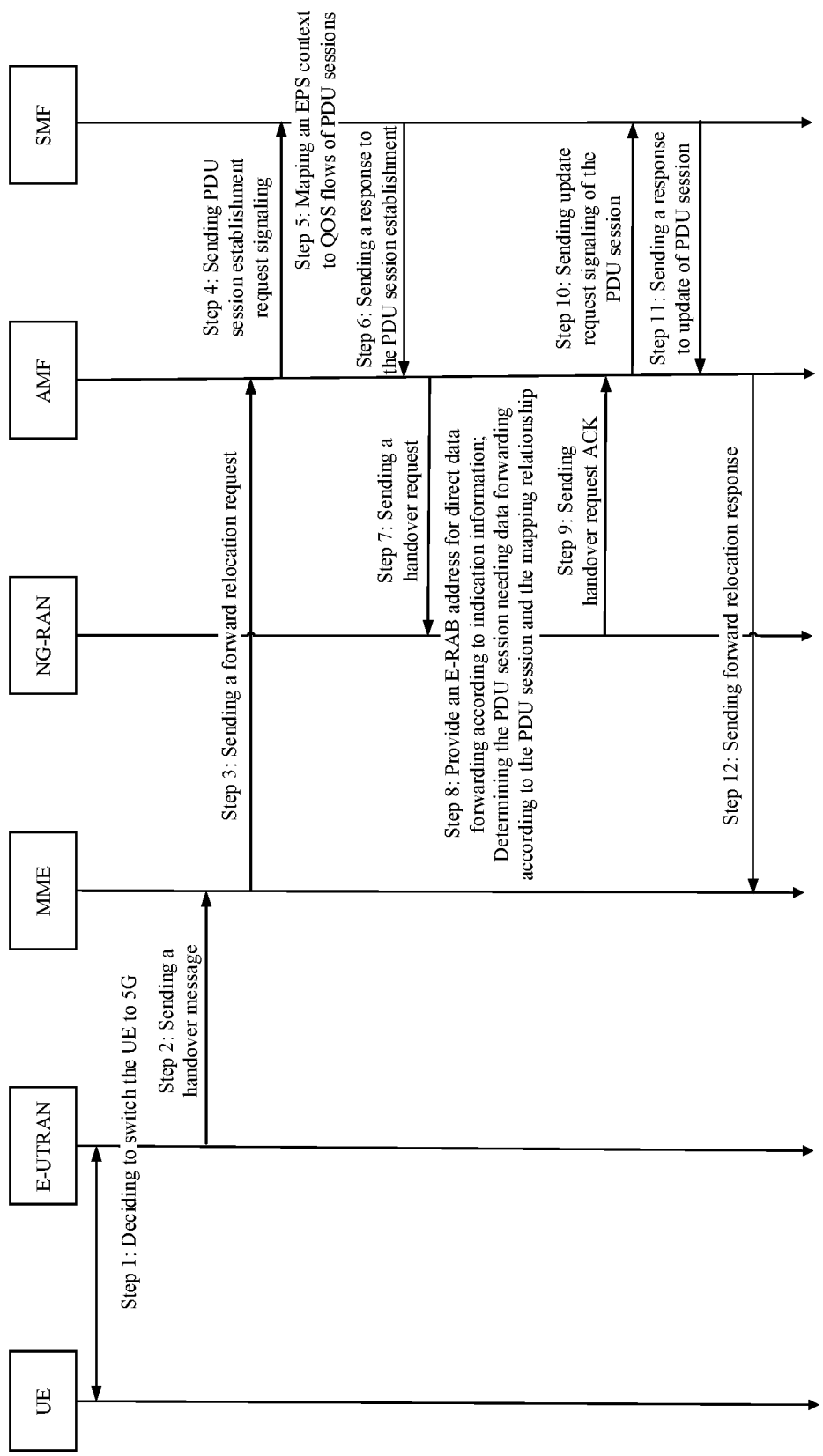
FIG. 7 is a timing chart of a method for communication system handover according to an embodiment of the present application.

In order to understand the solution provided by the embodiment of the present application more clearly, taking the source node supporting direct data forwarding as an example, the embodiment of the present application will be described in detail with reference to FIG. 7. FIG. 7 is a timing chart of a method for communication system handover according to an embodiment of the present application. The figure includes terminal UE, a source node E-UTRAN, a target NG-RAN node, the core network MME of an EPS, the core network AMF of a 5G system and the core network SMF of a 5G system.

Step 1: the E-UTRAN decides to switch the UE to 5G.

Step 2: the E-UTRAN sends Handover Required (a handover message) to the MME, where the Handover Required carries first indication information that the source node supports direct data forwarding and a target NG-RAN node identifier.

Step 3: the MME sends Forward Relocation Request (a handover request) to the AMF, where the Forward Relocation Request carries the first indication information that the source node supports direct data forwarding and the target NG-RAN node identifier.

Step 4: the AMF sends Nsmf_PDUSession_CreateSM-Context Request signaling (a PDU session establishment request) to the SMF. The signaling carries the EPS context of the UE, the first indication information that the source node supports direct data forwarding, the EPS context, the target NG-RAN node identifier and the source node identifier.

Step 5: SMF maps the EPS context to the QOS flows of the PDU sessions, and determines that the target NG-RAN node and the source node do not support indirect data forwarding according to the source node identifier and the target NG-RAN node identifier.

Step 6: the SMF sends Nsmf_PDUSession_CreateSM-Context Response signaling (a response to PDU session establishment) to the AMF. The signaling includes the PDU sessions, the mapping relationship between the EPS context and the PDU sessions, and the second indication information that the target NG-RAN node and the source node do not support indirect data forwarding.

Step 7: the AMF sends Handover Request (a handover request) to the NG-RAN corresponding to the above target NG-RAN node identifier. The Handover Request carries the first indication information, the second indication information, the PDU sessions and the mapping relationship.

Step 8: the NG-RAN determines the E-RAB address for direct data forwarding according to the first indication information and the second indication information, and determines the PDU session needing data forwarding according to the PDU sessions and the mapping relationship.

Step 9: the NG-RAN sends Handover Request ACK (a handover request confirmation) to the AMF. The ACK includes the E-RAB address and the PDU session needing data forwarding.

Step 10: the AMF sends Nsmf_PDUSession_UpdateSM-Context Request signaling (a PDU session updating request) to the SMF, where the signaling includes the PDU session needing data forwarding.

Step 11: the SMF sends Nsmf_PDUSession_UpdateSM-Context Response (a response to the PDU session updating) to the AMF. The response indicates that the preparation for data forwarding has been completed.

Step 12: the AMF sends Forward Relocation Response to the MME. The response includes the E-RAB address.

With the above method, the Handover Request sent by the AMF to the NG-RAN node and the PDU session establishment request sent by the AMF to the SMF carry the first indication information, so that decisions of the nodes of the EPS and the nodes of the 5G system on the data forwarding mode may be consistent.

Figure 8:
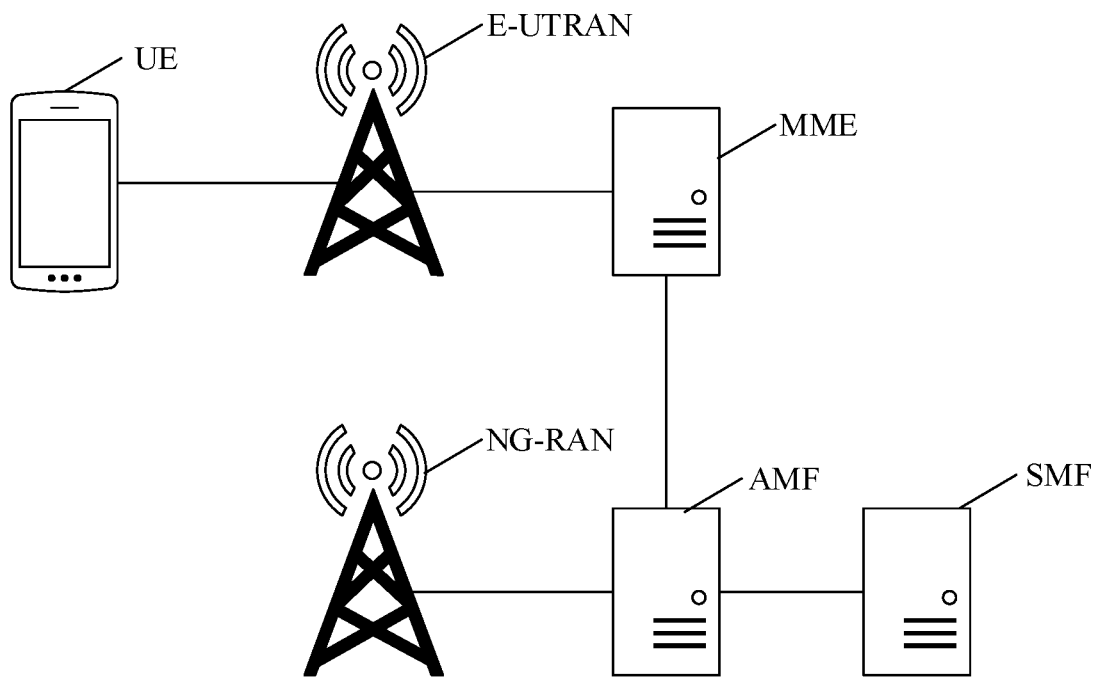
FIG. 8 is a schematic diagram of another application scenario of a method for communication system handover according to an embodiment of the present application.

Taking the source node not supporting direct data forwarding as an example, the embodiment of the present application will be further explained with reference to FIG. 8. FIG. 8 is a schematic diagram of an application scenario in which communication system handover is completed by an embodiment of the present application. The scenario includes UE, an E-UTRAN, an NG-RAN, an AMF and an SMF. In this scenario, the UE works in an EPS and three EPS bearers are provided. Only a bearer 1 and a bearer 2 have data to be forwarded.

The E-UTRAN decides to switch the UE to 5G. The E-UTRAN sends a handover message to the MME, where the handover message carries first indication information that the source node does not support direct data forwarding, an EPS bearer, the information that the corresponding EPS bearer 1 and bearer 2 have data to be forwarded, and a target NG-RAN node identifier.

The MME sends the information carried in the handover message to the AMF through a handover request. The AMF sends a PDU session establishment request to the SMF, where the PDU session establishment request carries the EPS bearer, the information that the corresponding EPS bearer 1 and bearer 2 have data to be forwarded, the first indication information that the source node does not support direct data forwarding, target NG-RAN node identifier and source node identifier. The SMF maps the bearer 1 and the bearer 2 to a PDU session 1, for example, the bearer 1 is mapped to QOS flows 1 and 2 of the PDU session 1, the bearer 2 is mapped to a QOS flow 3 of the PDU session 1; and a bearer 3 is mapped to a QOS flow 1 of a PDU session 2. According to the target NG-RAN node identifier and the source node identifier, the SMF determines second indication information, that is, the target NG-RAN node and the source node support indirect data forwarding.

The SMF sends the PDU Session 1 and the PDU Session 2, the mapping relationship, and the second indication information to the AMF.

The AMF sends the handover request to the NG-RAN. The handover request carries the PDU Session 1, the PDU Session 2, the mapping relationship and the second indication information. The NG-RAN determines that the PDU session 1 needs data forwarding according to the mapping relationship, provides an address for indirect data forwarding according to the second indication information, and sends the information that the PDU session 1 needs data forwarding and the address for indirect data forwarding to the AMF, so that the AMF forwards the them to the SMF.

According to the first indication information, the SMF determines that the source node does not support direct data forwarding. It is also determined that the source node and the target NG-RAN node support indirect data forwarding, so that, according to the address for indirect data forwarding provided by the NG-RAN node, an address of an intermediate node for indirect data forwarding is provided and sent to the AMF. The AMF sends the address of the intermediate node to the MME, so that the MME provides an address of an EPS side for indirect data forwarding according to the address of the intermediate node.

The UE may be a mobile phone, a personal computer, a notebook computer, a tablet computer, etc.

In the following, the embodiment of the present application will be further explained under the condition that the source node supports direct data forwarding by continuing to use FIG. 8. In this scenario, the UE works in an EPS and three EPS bearers are provided, only a bearer 1 and a bearer 2 have data to be forwarded.

The E-UTRAN decides to switch the UE to 5G. The E-UTRAN sends a handover message to the MME, where the handover message carries the first indication information that the source node supports direct data forwarding, the EPS bearer, the information that the corresponding EPS bearer 1 and bearer 2 have data to be forwarded, and the target NG-RAN node identifier.

The MME sends the information carried in the handover message to the AMF through the handover request. The AMF sends a PDU session establishment request to the SMF, where the PDU session establishment request carries the EPS bearer, the information that corresponding EPS bearer 1 and bearer 2 have data to be forwarded, and first indication information that the source node supports direct data forwarding. The SMF maps the bearer 1 and the bearer 2 to the PDU session 1, for example, the bearer 1 is mapped to QOS flows 1 and 2 of the PDU session 1, the bearer 2 is mapped to QOS flow 3 of the PDU session 1, and the bearer 3 is mapped to QOS flow 1 of the PDU session 2. The PDU session establishment request also includes the target NG-RAN node identifier and the source node identifier, and the SMF determines that indirect data forwarding may be carried out between the target NG-RAN node and the source node according to the source node identifier and the target NG-RAN node identifier. The SMF sends the second indication information that indirect data forwarding may be carried out between the NG-RAN node and the source node, the PDU session 1, the PDU session 2 and the mapping relationship to the AMF.

The AMF sends a handover request to the NG-RAN, where the handover request carries the PDU Session 1, the PDU Session 2, the mapping relationship, the first indication information and the second indication information. The NG-RAN determines that the PDU session 1 needs data forwarding according to the mapping relationship, determines to adopt direct data forwarding according to the first indication information and the second indication information, provides the E-RAB address for direct data forwarding, and sends the information that the PDU session 1 needs data forwarded and the E-RAB address to the AMF, so that the AMF forwards them to the SMF.

The SMF feeds back a response to the information forwarded by the AMF. The AMF sends the E-RAB address and the information that the PDU session 1 needs data forwarding to the MME.

With the above method, the E-UTRAN and the NG-RAN node may carry out direct data forward through the E-RAB address.

Based on the same inventive concept, the embodiment of the present application also provides a network device for communication system handover. The network device is a device that provides wireless communication function for a terminal, including but not limited to gNB in 5G, a radio network controller (RNC), a node B (NB), a base station controller (BSC), a base transceiver station (BTS), a home base station (for example, a home evolved node B or a home node B, HNB), a baseband unit (BBU), a transmitting and receiving point (TRP), a transmitting point (TP), a mobile handover center, etc. In the present application, the base station may also be a device that provides wireless communication functions for the terminal in other communication systems that may appear in the future.

Figure 9:
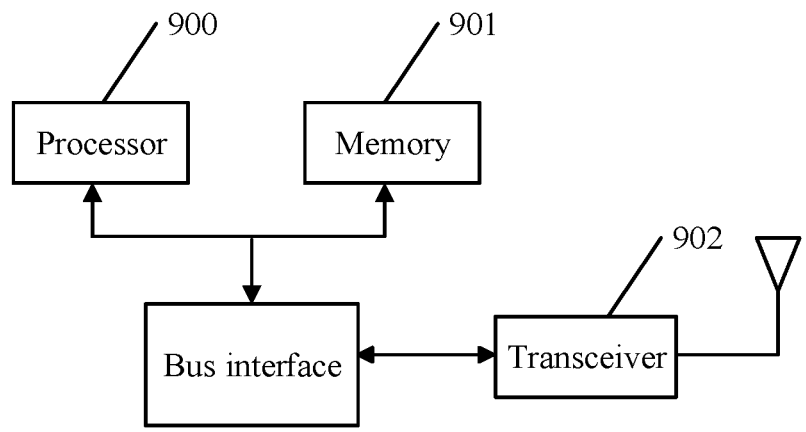
FIG. 9 is a schematic diagram of a first type of network device for communication system handover according to an embodiment of the present application.

As shown in FIG. 9, it is a first type of network device for communication system handover according to the embodiment of the present disclosure. The network device includes a processor 900, a memory 901 and a transceiver 902.

The processor 900 is responsible for managing a bus architecture and general processing, and the memory 901 may store data used by the processor 900 when carrying out operations. The transceiver 902 is used for receiving and transmitting data under the control of the processor 900.

The bus architecture may include any number of interconnected buses and bridges, specifically, one or more processors represented by the processor 900 and various circuits of the memory represented by the memory 901 are linked together. The bus architecture may also link various other circuits, such as peripheral devices, voltage regulators, power management circuits, etc., which are well known in the art, so they will not be further described here. A bus interface provides an interface. The processor 900 is responsible for managing the bus architecture and general processing, and the memory 901 may store the data used by the processor 900 when carrying out operations.

The flow disclosed in the embodiment of the present disclosure may be applied to or implemented by the processor 900. In the implementation process, each step of the signal processing flow may be completed by an integrated logic circuit of hardware or instructions in the form of software in the processor 900. The processor 900 may be a general-purpose processor, a digital signal processor, an application specific integrated circuit, a field programmable gate array or other programmable logic apparatus, a discrete gate or transistor logic apparatus, and a discrete hardware component, and may implement or carry out the methods, steps and logic block diagrams disclosed in the embodiments of the present disclosure. The general-purpose processor may be a microprocessor or any conventional processor. The steps of the method disclosed in connection with the embodiment of the present disclosure may be directly embodied as the completion of carrying out by a hardware processor, or by the combination of hardware and software devices in the processor. The software device may be located in mature storage media such as a random access memory, a flash memory, a read-only memory, a programmable read-only memory, an electrically erasable programmable memory, a register, etc. The storage medium is located in the memory 801, and the processor 900 reads the information in the memory 901 and completes the steps of the signal processing flow in combination with its hardware.

In one embodiment, the processor 900 is configured to read a program in the memory 901 and executing:

receiving a handover request sent by a core network side of an EPS, where the handover request carries first indication information about whether a source node supports direct data forwarding and a target NG-RAN node identifier; and sending the handover request carrying the first indication information to an NG-RAN node corresponding to the target NG-RAN node identifier, for determining an address of data forwarding by the NG-RAN node according to the first indication information.

In one embodiment, the first indication information is located in a newly added IE of the handover request; or, the first indication information is located in an original IE of the handover request.

In one embodiment, the processor is further configured to: acquire an EPS context of a terminal needing system handover; send a PDU session establishment request to an SMF, where the PDU session establishment request carries the first indication information, the EPS context, the target NG-RAN node identifier and the source node identifier of the source node; and receive a response, returned by the SMF, to the PDU session establishment request, where the response includes PDU sessions, a mapping relationship between the PDU sessions and the EPS context, and second indication information about whether the target NG-RAN node and the source node support indirect data forwarding.

In one embodiment, the first indication information is located in the newly added IE of the PDU session establishment request; or, the first indication information is stored in the original IE of the PDU session establishment request.

In one embodiment, the processor is configured to: send a handover request carrying the PDU sessions, the mapping relationship, the first indication information and the second indication information to the NG-RAN node corresponding to the NG-RAN node identifier, for determining a PDU session needing data forwarding according to the PDU sessions and the mapping relationship, and determining the address of data forwarding according to the first indication information and the second indication information by the NG-RAN node;

receive the PDU session which is determined to need data forwarding and the determined address of data forwarding sent by the NG-RAN node; and forward the PDU session needing data forwarding and the determined address of data forwarding to the SMF.

In one embodiment, when the first indication information indicates that the source node does not support direct data forwarding, and the second indication information indicates that the source node and the target NG-RAN node support indirect data forwarding, the processor is further configured to: receive an address of an intermediate node sent by the SMF for supporting indirect data forwarding; and send the address of the intermediate node for supporting indirect data forwarding to the core network of the EPS.

In one embodiment, when the first indication information indicates that the source node supports direct data forwarding, the processor is further configured to: send the E-RAB address allocated by the NG-RAN node to the core network of the EPS.

Figure 10:
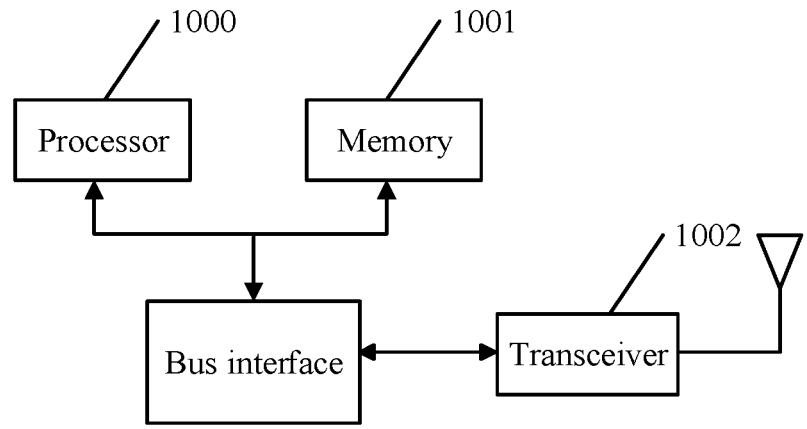
FIG. 10 is a schematic diagram of a second type of network device for communication system handover according to an embodiment of the present application.

As shown in FIG. 10, it is a second type of network device for communication system handover according to the embodiment of the present disclosure. The network device includes a processor 1000, a memory 1001 and a transceiver 1002.

The processor 1000 is responsible for managing a bus architecture and general processing, and the memory 1001 may store data used by the processor 1000 when carrying out operations. The transceiver 1002 is used for receiving and transmitting data under the control of the processor 1000.

The bus architecture may include any number of interconnected buses and bridges. In one embodiment, one or more processors represented by the processor 1000 and various circuits of the memory represented by the memory 1001 are linked together. The bus architecture may also link various other circuits, such as peripheral devices, voltage regulators, power management circuits, etc., which are well known in the art, so they will not be further described here. A bus interface provides an interface. The processor 1000 is responsible for managing the bus architecture and general processing, and the memory 1001 may store data used by the processor 1000 when carrying out operations.

The flow disclosed in the embodiment of the present disclosure may be applied to or implemented by the processor 1000. In the implementation process, each step of the signal processing flow may be completed by an integrated logic circuit of hardware or instructions in the form of software in the processor 1000. The processor 1000 may be a general-purpose processor, a digital signal processor, an application specific integrated circuit, a field programmable gate array or other programmable logic apparatus, a discrete gate or transistor logic apparatus, and a discrete hardware component, and may implement or carry out the methods, steps and logic block diagrams disclosed in the embodiments of the present disclosure. The general-purpose processor may be a microprocessor or any conventional processor. The steps of the method disclosed in connection with the embodiment of the present disclosure may be directly embodied as the completion of carrying out by a hardware processor, or by the combination of hardware and software devices in the processor. The software device may be located in mature storage media such as a random access memory, a flash memory, a read-only memory, a programmable read-only memory, an electrically erasable programmable memory, a register, etc. The storage medium is located in the memory 1001, and the processor 1000 reads the information in the memory 1001 and completes the steps of the signal processing flow in combination with its hardware.

In one embodiment, the processor 1000 is configured to read a program in the memory 1001 and executing:

receiving a handover request sent by an AMF, where the handover request carries first indication information about whether a source node supports direct data forwarding; and the processor is further configured to determine an address of data forwarding according to the first indication information.

In one embodiment, the handover request further includes PDU sessions, a mapping relationship between an EPS context and QOS flows of the PDU sessions, and second indication information about whether the target NG-RAN node and the source node support indirect data forwarding; and the processor is further configured to determine the PDU session needing data forwarding according to the mapping relationship and the PDU sessions;

where the processor is configured to: determine the address of data forwarding according to the first indication information and the second indication information; and send the PDU session needing data forwarding and the determined address of data forwarding to the AMF, for forwarding the PDU session needing data forwarding and the determined address of data forwarding by the AMF to an SMF.

Figure 11:
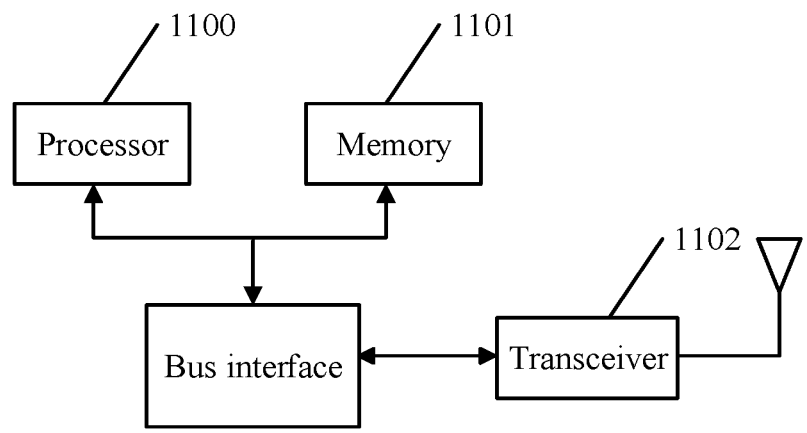
FIG. 11 is a schematic diagram of a third type of network device for communication system handover according to an embodiment of the present application.

As shown in FIG. 11, it is a third type of network device for communication system handover according to the embodiment of the present disclosure. The network device includes a processor 1100, a memory 1101 and a transceiver 1102.

The processor 1100 is responsible for managing a bus architecture and general processing, and the memory 1101 may store data used by the processor 1100 when carrying out operations. The transceiver 1102 is used for receiving and transmitting data under the control of the processor 1100.

The bus architecture may include any number of interconnected buses and bridges. In one embodiment, one or more processors represented by the processor 1100 and various circuits of the memory represented by the memory 1101 are linked together. The bus architecture may also link various other circuits, such as peripheral devices, voltage regulators, power management circuits, etc., which are well known in the art, so they will not be further described here. A bus interface provides an interface. The processor 1100 is responsible for managing the bus architecture and general processing, and the memory 1101 may store the data used by the processor 1100 when carrying out operations.

The flow disclosed in the embodiment of the present disclosure may be applied to or implemented by the processor 1100. In the implementation process, each step of the signal processing flow may be completed by an integrated logic circuit of hardware or instructions in the form of software in the processor 1100. The processor 1100 may be a general-purpose processor, a digital signal processor, an application specific integrated circuit, a field programmable gate array or other programmable logic apparatus, a discrete gate or transistor logic apparatus, and a discrete hardware component, and may implement or carry out the methods, steps and logic block diagrams disclosed in the embodiments of the present disclosure. The general-purpose processor may be a microprocessor or any conventional processor. The steps of the method disclosed in connection with the embodiment of the present disclosure may be directly embodied as the completion of carrying out by a hardware processor, or by the combination of hardware and software devices in the processor. The software device may be located in mature storage media such as a random access memory, a flash memory, a read-only memory, a programmable read-only memory, an electrically erasable programmable memory, a register, etc. The storage medium is located in the memory 801, and the processor 1100 reads the information in the memory 1101 and completes the steps of the signal processing flow in combination with its hardware.

In one embodiment, the processor 1100 is configured to read a program in the memory 1101 and executing:

receiving a PDU session establishment request sent by an AMF, where the PDU session establishment request carries first indication information about whether a source node supports direct data forwarding, a target NG-RAN node identifier, and a source node identifier of the source node; and returning a response to the PDU session establishment request to the AMF, where the response includes PDU sessions, a mapping relationship between the PDU sessions and an EPS context, and second indication information about whether a target NG-RAN node and the source node support indirect data forwarding, for sending the PDU sessions, the mapping relationship and the second indication information by the AMF to the NG-RAN node.

In one embodiment, the processor is further configured to determine whether the NG-RAN node and the source node support indirect data forwarding according to the target NG-RAN node identifier and the source node identifier; and mapping the EPS context to QOS flows of the PDU sessions.

In one embodiment, the processor is further configured to send an address of an intermediate node for supporting indirect data forwarding to the AMF when the first indication information indicates that the source node does not support direct data forwarding and the second indication information indicates that the source node and the target NG-RAN node support indirect data forwarding.

Figure 12:
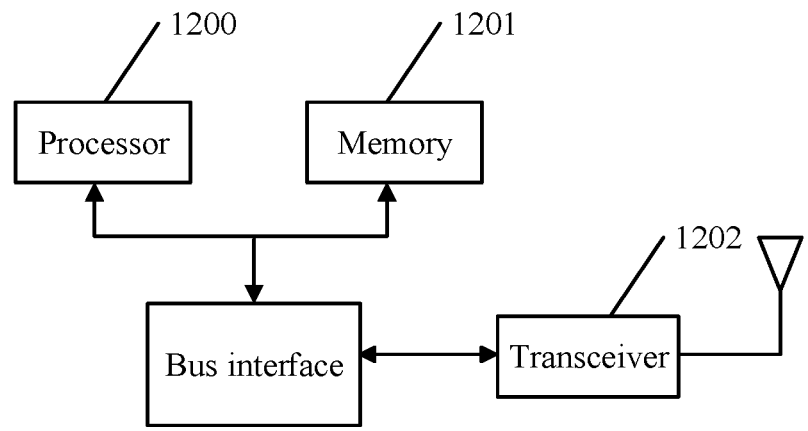
FIG. 12 is a schematic diagram of a fourth type of network device for communication system handover according to an embodiment of the present application.

As shown in FIG. 12, it is a third type of network device for communication system handover according to the embodiment of the present disclosure. The network device includes a processor 1200, a memory 1201 and a transceiver 1202.

The processor 1200 is responsible for managing a bus architecture and general processing, and the memory 1201 may store data used by the processor 1200 when carrying out operations. The transceiver 1202 is used for receiving and transmitting data under the control of the processor 1200.

The bus architecture may include any number of interconnected buses and bridges, specifically, one or more processors represented by the processor 1200 and various circuits of the memory represented by the memory 1201 are linked together. The bus architecture may also link various other circuits, such as peripheral devices, voltage regulators, power management circuits, etc., which are well known in the art, so they will not be further described here. A bus interface provides an interface. The processor 1200 is responsible for managing the bus architecture and general processing, and the memory 1201 may store the data used by the processor 1200 when carrying out operations.

The flow disclosed in the embodiment of the present disclosure may be applied to or implemented by the processor 1200. In the implementation process, each step of the signal processing flow may be completed by an integrated logic circuit of hardware or instructions in the form of software in the processor 1200. The processor 1200 may be a general-purpose processor, a digital signal processor, an application specific integrated circuit, a field programmable gate array or other programmable logic apparatus, a discrete gate or transistor logic apparatus, and a discrete hardware component, and may implement or carry out the methods, steps and logic block diagrams disclosed in the embodiments of the present disclosure. The general-purpose processor may be a microprocessor or any conventional processor. The steps of the method disclosed in connection with the embodiment of the present disclosure may be directly embodied as the completion of carrying out by a hardware processor, or by the combination of hardware and software devices in the processor. The software device may be located in mature storage media such as a random access memory, a flash memory, a read-only memory, a programmable read-only memory, an electrically erasable programmable memory, a register, etc. The storage medium is located in the memory 801, and the processor 1200 reads the information in the memory 1201 and completes the steps of the signal processing flow in combination with its hardware.

In one embodiment, the processor 1200 is configured to read a program in the memory 1201 and executing:
- receiving a handover message sent by a source node, where the handover message includes a target NG-RAN node identifier and first indication information about whether the source node supports direct data forwarding;
- sending a handover request to the AMF, where the handover request carries the first indication information and the target NG-RAN node identifier, for sending the handover request carrying the first indication information by the AMF to an NG-RAN node corresponding to the target NG-RAN node identifier.

In one embodiment, when the first indication information indicates that the source node does not support direct data forwarding, the processor is further configured to: receive an intermediate node address for indirect data forwarding sent by the AMF; and
- according to the address of the intermediate node, provide an EPS address for indirect data forwarding.

In one embodiment, when the first indication information indicates that the source node supports direct data forwarding, and the processor is further configured to: receive an E-RAB address for supporting direct data forwarding sent by the AMF.

Figure 13:
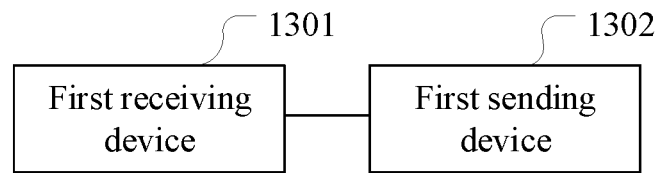
FIG. 13 is a schematic diagram of a first type of apparatus for communication system handover according to an embodiment of the present application.

Based on the same inventive concept, an embodiment of the present application further provides an apparatus for communication system handover. As shown in FIG. 13, a first apparatus for communication system handover according to the embodiment of the present application includes:
- a first receiving device 1301, configured to receive a handover request sent by a core network side of an EPS, where the handover request carries first indication information about whether a source node supports direct data forwarding and a target NG-RAN node identifier; and
- a first sending device 1302, configured to send the handover request carrying the first indication information to an NG-RAN node corresponding to the target NG-RAN node identifier, for determining an address of data forwarding by the NG-RAN node according to the first indication information.

In one embodiment, the first indication information is located in a newly added IE of the handover request; or,
the first indication information is located in an original IE of the handover request.

In one embodiment, the first sending device 1302 is further configured to acquire an EPS context of a terminal needing system handover; and
send a PDU session establishment request to an SMF, where the PDU session establishment request carries the first indication information, the EPS context, the target NG-RAN node identifier and the source node identifier of the source node; and
the first receiving device 1301 is further configured to receive a response returned by the SMF to the PDU session establishment request, where the response includes PDU sessions, a mapping relationship between the PDU sessions and the EPS context, and second indication information about whether the target NG-RAN node and the source node support indirect data forwarding.

In one embodiment, the first indication information is located in the newly added IE of the PDU session establishment request; or,
the first indication information is stored in the original IE of the PDU session establishment request.

In one embodiment, the first sending device 1302 is configured to send a handover request carrying the PDU sessions, the mapping relationship, the first indication information and the second indication information to the NG-RAN node corresponding to the NG-RAN node identifier, for determining a PDU session needing data forwarding according to the PDU sessions and the mapping relationship and determining the address of data forwarding according to the first indication information and the second indication information by the NG-RAN node;
the first receiving device 1301 is further configured to receive the PDU session which is determined to need data forwarding and the determined address of data forwarding sent by the NG-RAN node; and
the first sending device 1302 is further configured to forward the PDU session needing data forwarding and the determined address of data forwarding to the SMF.

In one embodiment, when the first indication information indicates that the source node does not support direct data forwarding, and the second indication information indicates that the source node and the target NG-RAN node support indirect data forwarding, the first receiving device 1301 is further configured to receive an address of an intermediate node sent by the SMF for supporting indirect data forwarding; and
the first sending device 1302 is further configured to send the address of the intermediate node for supporting indirect data forwarding to the core network of the EPS.

In one embodiment, when the first indication information indicates that the source node does not support direct data forwarding, the first sending device 1302 is further configured to send the E-RAB address allocated by the NG-RAN node to the core network of the EPS.

Figure 14:
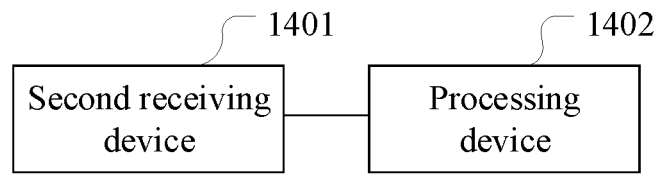
FIG. 14 is a schematic diagram of a second type of apparatus for communication system handover according to an embodiment of the present application.

As shown in FIG. 14, a second type of apparatus for communication system handover according to an embodiment of the present application includes:
- a second receiving device 1401, configured to receive a handover request sent by an AMF, where the handover request carries first indication information about whether a source node supports direct data forwarding; and
- a processing device 1402, configured to determine an address of data forwarding according to the first indication information.

In one embodiment, the handover request further includes PDU sessions, a mapping relationship between an EPS context and QOS flows of the PDU sessions, and second indication information about whether a target NG-RAN node and a source node support indirect data forwarding. The processing device 1402 is further configured to:
according to the mapping relationship and the PDU sessions, determine the PDU session needing data forwarding;
the processing device 1402 is configured to: determine the address of data forwarding according to the first indication information and the second indication information; and
send the PDU session needing data forwarding and the determined address of data forwarding to the AMF, for forwarding the PDU session needing data forwarding and the determined address of data forwarding by the AMF to the SMF.

Figure 15:
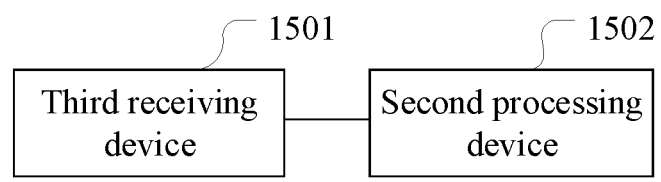
FIG. 15 is a schematic diagram of a third type of apparatus for communication system handover according to an embodiment of the present application.

As shown in FIG. 15, a third type of apparatus for communication system handover according to an embodiment of the present application includes:

a third receiving device 1501, configured to receive a PDU session establishment request sent by an AMF, where the PDU session establishment request carries first indication information about whether the source node supports direct data forwarding, an EPS context, a target NG-RAN node identifier and a source node identifier; and a second processing device 1502, configured to return a response to the PDU session establishment request to the AMF, where the response includes the PDU sessions and a mapping relationship between the PDU sessions and the EPS context, and second indication information about whether the target NG-RAN node and the source node support indirect data forwarding, for sending the PDU sessions, the mapping relationship and the second indication information by the AMF to the NG-RAN node.

In one embodiment, after receiving the PDU session establishment request sent by the AMF, the third receiving device 1501 is further configured to: determine whether the NG-RAN node and the source node support indirect data forwarding according to the target NG-RAN node identifier and the source node identifier, and map the EPS context to the QOS flows of the PDU sessions.

In one embodiment, the second processing device 1502 is further configured to send an address of an intermediate node for supporting indirect data forwarding to the AMF when the first indication information indicates that the source node does not support direct data forwarding and the second indication information indicates that the source node and the target NG-RAN node support indirect data forwarding.

Figure 16:
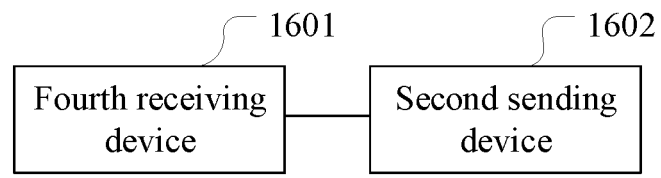
FIG. 16 is a schematic diagram of a fourth type of apparatus for communication system handover according to an embodiment of the present application.

As shown in FIG. 16, a fourth type of apparatus for communication system handover according to an embodiment of the present application includes:

a fourth receiving device 1601, configured to receive a handover message sent by a source node, where the handover message includes a target NG-RAN node identifier and first indication information about whether the source node supports direct data forwarding; and a second sending device 1602, configured to send a handover request to an AMF, where the handover request carries the first indication information and the target NG-RAN node identifier, for sending the handover request carrying the first indication information by the AMF to an NG-RAN node corresponding to the target NG-RAN node identifier.

In one embodiment, when the first indication information indicates that the source node does not support direct data forwarding, the apparatus further includes:

the fourth receiving device 1601 is further configured to receive an address of an intermediate node for indirect data forwarding sent by the AMF; and according to the address of the intermediate node, providing an EPS address for indirect data forwarding.

In one embodiment, when the first indication information indicates that the source node supports direct data forwarding, the fourth receiving device 1601 is further configured to receive the E-RAB address for supporting direct data forwarding sent by the AMF.

A computer-storable medium has stored thereon a computer program which, when carried out by a processor, implements the steps of the methods described in FIG. 2, FIG. 4, FIG. 5, FIG. 6 or FIG. 7.

The present application is described above with reference to block diagrams and/or flowcharts showing methods, apparatuses (systems) and/or computer program products according to embodiments of the present application. It should be understood that one block of the block diagrams and/or flowchart illustrations and a combination of blocks of the block diagrams and/or flowchart illustrations can be implemented by computer program instructions. These computer program instructions may be provided to a processor of a general purpose computer, a special purpose computer, and/or other programmable data processing apparatus to produce a machine, and the instructions which carry out via the computer processor and/or other programmable data processing apparatus create methods for implementing the functions/acts specified in the block diagrams and/or flowchart blocks.

Accordingly, the present application can also be implemented in hardware and/or software (including firmware, resident software, microcode, etc.). Further, the present application can take the form of a computer program product on a computer usable or computer readable storage medium having computer usable or computer readable program code embodied in the medium for use by or in connection with an instruction execution system. In the context of the present application, a computer-usable or computer-readable medium can be any medium that can contain, store, communicate, transmit, or transport the program for use by or in connection with an instruction execution system, apparatus, or device.

What is claimed is:

1. A method for communication system handover, wherein the method is applied to an authentication management function node (AMF) of a 5G system, the method comprising:

receiving a handover request sent by a core network side of an evolved packet system (EPS), wherein the handover request carries first indication information about whether a source node supports direct data forwarding and a target next generation-radio access network (NG-RAN) node identifier; and sending the handover request carrying the first indication information to a target NG-RAN node corresponding to the target NG-RAN node identifier, for determining an address of data forwarding by the target NG-RAN node according to the first indication information;

wherein the sending the handover request carrying the first indication information to the target NG-RAN node corresponding to the target NG-RAN node identifier comprises:

sending a handover request carrying protocol data unit (PDU) sessions, a mapping relationship between an EPS context of a terminal needing system handover and the PDU sessions, the first indication information and second indication information about whether the target NG-RAN node and the source node support indirect data forwarding to the target NG-RAN node corresponding to the target NG-RAN node identifier, for determining a PDU session needing data forwarding according to the PDU sessions and the mapping relationship and determining the address of data forwarding according to the first indication information and the second indication information by the target NG-RAN node;

receiving the PDU session which is determined to need data forwarding and the determined address of data forwarding sent by the target NG-RAN node; and forwarding the PDU session needing data forwarding and the determined address of data forwarding to an SMF.

2. The method according to claim 1, wherein the first indication information is located in a newly added information element (IE) of the handover request; or, the first indication information is located in an original IE of the handover request.

3. The method according to claim 1, further comprising: acquiring the EPS context;

sending a PDU session establishment request to a session management function (SMF), wherein the PDU session establishment request carries the first indication information, the EPS context, the target NG-RAN node identifier and a source node identifier of the source node; and receiving a response, returned by the SMF, to the PDU session establishment request, wherein the response comprises PDU sessions, the mapping relationship, and the second indication information.

4. The method according to claim 3, wherein the first indication information is located in a newly added IE of the PDU session establishment request; or, the first indication information is stored in an original IE of the PDU session establishment request.

5. The method according to claim 1, wherein when the first indication information indicates that the source node does not support direct data forwarding and second indication information indicates that the source node and the target NG-RAN node support indirect data forwarding, the method further comprises:

receiving an address of an intermediate node sent by an SMF for supporting indirect data forwarding; and sending the address of the intermediate node for supporting indirect data forwarding to the core network of the EPS.

6. The method according to claim 1, wherein when the first indication information indicates that the source node supports direct data forwarding, the method further comprises:

sending an evolved radio access bearer (E-RAB) address allocated by the target NG-RAN node to the core network of the EPS.

7. A method for communication system handover, wherein the method is applied to a next generation-radio access network (NG-RAN) of a 5G system, the method comprising:

receiving a handover request sent by an authentication management function (AMF), wherein the handover request carries first indication information about whether a source node supports direct data forwarding; and determining an address of data forwarding according to the first indication information;

wherein the handover request further comprises protocol data unit (PDU) sessions, a mapping relationship between an evolved packet system (EPS) context and quality of service (QOS) flows of the PDU sessions, and second indication information about whether a target NG-RAN node and the source node support indirect data forwarding, and the method further comprises:

determining the PDU session needing data forwarding according to the mapping relationship and the PDU sessions;

wherein the determining the address of data forwarding according to the first indication information comprises:

determining the address of data forwarding according to the first indication information and the second indication information; and sending the PDU session needing data forwarding and the determined address of data forwarding to the AMF, for forwarding the PDU session needing data forwarding and the determined address of data forwarding by the AMF to a session management function node (SMF).

8. A method for communication system handover, wherein the method is applied to a session management function node (SMF) of a 5G system, the method comprising:

receiving a protocol data unit (PDU) session establishment request sent by an authentication management function (AMF), wherein the PDU session establishment request carries first indication information about whether a source node supports direct data forwarding, an evolved packet system (EPS) context, a target next generation-radio access network (NG-RAN) node identifier and a source node identifier;

returning a response to the PDU session establishment request to the AMF, wherein the response comprises PDU sessions, a mapping relationship between the PDU sessions and the EPS context, and second indication information about whether a target NG-RAN node and the source node support indirect data forwarding, for sending the PDU sessions, the mapping relationship and the second indication information by the AMF to the target NG-RAN node, and for receiving by the AMF a PDU session which is determined to need data forwarding according to the PDU sessions and the mapping relationship and the determined address of data forwarding according to the first indication information and the second indication information sent by the target NG-RAN node; and receiving the PDU session needing data forwarding and the determined address of data forwarding forwarded by the AMF.

9. The method according to claim 8, wherein after receiving the PDU session establishment request sent by the AMF, the method further comprises:

determining whether the target NG-RAN node and the source node support indirect data forwarding according to the target NG-RAN node identifier and the source node identifier; and mapping the EPS context to quality of service (QOS) flows of the PDU sessions.

10. The method according to claim 8, wherein the method further comprises:

sending an address of an intermediate node for supporting indirect data forwarding to the AMF, when the first indication information indicates that the source node does not support direct data forwarding and the second indication information indicates that the source node and the target NG-RAN node support indirect data forwarding.

11. A method for communication system handover, wherein the method is applied to a core network mobility management entity (MME) of an evolved packet system (EPS), the method comprising:

receiving a handover message sent by a source node, wherein the handover message comprises a target next generation-radio access network (NG-RAN) node identifier and first indication information about whether the source node supports direct data forwarding; and sending a handover request to an authentication management function (AMF), wherein the handover request carries the first indication information and the target NG-RAN node identifier, for sending by the AMF a handover request carrying protocol data unit (PDU)

sessions, a mapping relationship between an EPS context of a terminal needing system handover and the PDU sessions, the first indication information and second indication information about whether a target NG-RAN node and the source node support indirect data forwarding to the target NG-RAN node corresponding to the target NG-RAN node identifier, and for receiving by the AMF a PDU session which is determined to need data forwarding according to the PDU sessions and the mapping relationship and address of data forwarding determined according to the first indication information and the second indication information sent by the target NG-RAN node.

12. The method according to claim 11, wherein when the first indication information indicates that the source node does not support direct data forwarding, the method further comprises:
   receiving an address of an intermediate node for indirect data forwarding sent by the AMF; and
   providing an address for indirect data forwarding at an EPS side according to the address of the intermediate node.

13. The method according to claim 12, wherein when the first indication information indicates that the source node supports direct data forwarding, the method further comprises:
   receiving an evolved radio access bearer (E-RAB) address for supporting direct data forwarding sent by the AMF.

14. A non-transitory computer readable medium, storing computer executable instructions for executing the method according to claim 1.

* * * * *